United States Patent
Schroeder et al.

(10) Patent No.: US 12,233,685 B2
(45) Date of Patent: Feb. 25, 2025

(54) REHEATING METHOD FOR OPERATING A REFRIGERATION SYSTEM FOR A MOTOR VEHICLE, REFRIGERATION SYSTEM, AND MOTOR VEHICLE HAVING A REFRIGERATION SYSTEM OF THIS TYPE

(71) Applicant: AUDI AG, Ingolstadt (DE)

(72) Inventors: Dirk Schroeder, Manching (DE); Christian Rebinger, Munich (DE); Helmut Rottenkolber, Mindelstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/768,712

(22) PCT Filed: Sep. 28, 2020

(86) PCT No.: PCT/EP2020/077051
§ 371 (c)(1),
(2) Date: Apr. 13, 2022

(87) PCT Pub. No.: WO2021/115655
PCT Pub. Date: Jun. 17, 2021

(65) Prior Publication Data
US 2024/0131897 A1   Apr. 25, 2024
US 2024/0227500 A9   Jul. 11, 2024

(30) Foreign Application Priority Data
Dec. 9, 2019  (DE) .......................... 102019133546.9

(51) Int. Cl.
*B60H 1/00* (2006.01)
*F25B 5/02* (2006.01)
(Continued)

(52) U.S. Cl.
CPC ........... *B60H 1/00842* (2013.01); *F25B 5/02* (2013.01); *F25B 41/31* (2021.01); *F25B 41/40* (2021.01); *F25B 2313/02791* (2013.01)

(58) Field of Classification Search
CPC ............ B60H 1/00842; B60H 1/00835; B60H 1/00864; F25B 41/31; F25B 41/40; F25B 5/02; F25B 2313/02791
See application file for complete search history.

(56) References Cited

U.S. PATENT DOCUMENTS 4,465,123 A * 8/1984 Sarsten .............. B60H 1/00842
                                                    165/204
5,299,431 A    4/1994 Iritani et al.
(Continued)

FOREIGN PATENT DOCUMENTS

CN    109328147 A    2/2019
CN    112533782 A    3/2021
(Continued)

OTHER PUBLICATIONS

English translation of Thuez (EP 2743107 A1). (Year: 2014).*
(Continued)

*Primary Examiner* — Miguel A Diaz
(74) *Attorney, Agent, or Firm* — Maier & Maier, PLLC

(57) ABSTRACT

A reheating method for operating a refrigeration system for a motor vehicle. The refrigeration system includes a refrigerant compressor, connected to a primary line and a secondary line; an external heat exchanger; an evaporator; a heating register; at least one movable temperature flap; and at least one shutoff element, which is arranged downstream of the heating register in the secondary line. The reheating method includes following steps: setting the at least one shutoff element in a position in which the refrigerant flows into the evaporator downstream of the heating register while bypassing the external heat exchanger, and incorporating at (Continued)

least one further heat sink, which is fluidically arranged in parallel or in series to the evaporator, in particular a chiller operating as a water heat pump evaporator and/or the external heat exchanger operating as an air heat pump evaporator.

20 Claims, 4 Drawing Sheets

(51) Int. Cl.
*F25B 41/31* (2021.01)
*F25B 41/40* (2021.01)

(56) References Cited

U.S. PATENT DOCUMENTS

| | | | | |
|---|---|---|---|---|
| 5,473,906 | A * | 12/1995 | Hara | B60H 1/00007 62/90 |
| 9,925,877 | B2 * | 3/2018 | Miyakoshi | B60L 1/003 |
| 2012/0085114 | A1 * | 4/2012 | Graaf | B60H 1/323 62/238.7 |

FOREIGN PATENT DOCUMENTS

| | | |
|---|---|---|
| DE | 10126257 A1 | 12/2002 |
| DE | 102010000990 A1 | 7/2011 |
| DE | 102010042127 A1 | 4/2012 |
| DE | 102011118162 A1 | 5/2013 |
| DE | 102014017446 A1 | 6/2015 |
| DE | 102015012995 A1 | 4/2016 |
| DE | 102015010552 B3 | 1/2017 |
| DE | 102016008743 B3 | 10/2017 |
| DE | 112017005310 T5 | 8/2019 |
| DE | 102018213232 A1 | 2/2020 |
| EP | 0989003 A2 | 3/2000 |
| EP | 1456046 A1 | 9/2004 |
| EP | 2743107 A1 | 6/2014 |
| WO | 2020030556 A1 | 2/2020 |

OTHER PUBLICATIONS

German Examination Report issued on Jun. 19, 2020, in connection with corresponding German Application No. 10 2019 133 546.9 (10 pp., including machine-generated English translation).

International Search Report with English translation issued on Jan. 22, 2021, in corresponding International Application No. PCT/EP2020/077051; 8 pages.

International Preliminary Report on Patentability with English translation issued on May 17, 2022, in corresponding International Application No. PCT/EP2020/077051; 17 pages.

Office Action issued on Aug. 10, 2024, in corresponding Chinese Application No. 202080083076.9, 27 pages.

* cited by examiner

REHEATING METHOD FOR OPERATING A REFRIGERATION SYSTEM FOR A MOTOR VEHICLE, REFRIGERATION SYSTEM, AND MOTOR VEHICLE HAVING A REFRIGERATION SYSTEM OF THIS TYPE

FIELD

The invention relates to a reheating method (RH II) for operating a refrigeration system having heat pump function for a motor vehicle, a refrigeration system, and a motor vehicle having a refrigeration system of this type.

BACKGROUND

A refrigeration system having a heat pump function typically comprises a refrigerant compressor, which is connectable or connected to a primary line and a secondary line; an external heat exchanger, which is arranged in the primary line; an evaporator, which is arranged in the primary line, a heating register, which is arranged in the secondary line, at least one movable temperature flap, which is arranged before or after the heating register with respect to a supply air flow direction; and at least one shutoff element, which is arranged downstream of the heating register in the secondary line.

Such a refrigeration system having a heat pump function is described, for example, in DE 10 2018 213 232.1, which was not yet published at the time the present application was filed.

Further items of background information on refrigeration systems or heat pumps are found, for example, in documents DE 101 26 257 A1, DE 10 2015 010 552 B3, and DE 10 2015 012 995 Bl.

In a reheating method, which is also referred to in technical jargon as reheat, reheat mode, and reheat method, in the climate control of a vehicle interior, the air cooled and dehumidified by the evaporator is brought to a desired air outlet temperature by at least partial heating by means of the heating register.

The heating register is a heat source in which heat stored in the refrigerant is emitted to another medium, such as air, water, water-glycol mixture, and the like. The heating register can be designed as a heating condenser or heating gas cooler if (ambient) air flows through it directly as cabin supply air, which absorbs the emitted heat. The heating register can be designed as a fluid heat exchanger if a fluid other than (ambient air), for example, water, water-glycol mixture, or the like flows through or around it, wherein the heat stored in the refrigerant is emitted to the fluid. In the design as a fluid heat exchanger, a further heat transfer takes place from the heated fluid to the (ambient) air. Indirect heating of (ambient) air as a cabin supply air flow is thus carried out by a fluid heat exchanger.

At least one temperature flap can be used in the air flow path between the evaporator and the heating register (thus upstream of the heating register), which is entirely closed (0% open or closed position) when the air is to be conducted in cooled and not heated form into the vehicle interior. When the temperature flap is completely open (100% open position), essentially the entire air flow coming from the evaporator is conducted via the heating register and heated. In the case of partial opening of the temperature flap, a part of the air is conducted via the heating register and the other part of the air is conducted around the heating register and not heated, so that a mixture of heated and cooled air forms downstream of the heating register, which is then conducted to the vehicle interior. The adjustable temperature flap can alternatively also be arranged downstream of the heating register.

SUMMARY

The underlying object of the invention is considered to be that of specifying a reheating method which enables optimized operation of the refrigeration system.

This object is achieved by a reheating method, by a refrigeration system, and by a motor vehicle.

A reheating method for operating a refrigeration system for a motor vehicle is thus proposed, wherein the refrigeration system comprises:

a refrigerant compressor, which is connectable or connected to a primary line and a secondary line;
an external heat exchanger, which is arranged in the primary line;
an evaporator, which is arranged in the primary line;
a heating register, which is arranged in the secondary line;
at least one movable temperature flap, which is arranged before or after (upstream or downstream of) the heating register with respect to a supply air flow direction;
at least one shutoff element, which is arranged downstream of the heating register in the secondary line;
wherein the reheating method comprises the following steps:
setting the at least one shutoff element in a position in which the refrigerant flows into the evaporator downstream of the heating register while bypassing the external heat exchanger, and
incorporating at least one further heat sink, which is fluidically arranged in parallel or in series to the evaporator, in particular a chiller operating as a water heat pump evaporator and/or the external heat exchanger operating as an air heat pump evaporator.

Such a reheating method can be used in particular if an increasing heating demand is established, which can no longer be covered solely by the heat transferred at the evaporator and/or via the compressor into the refrigerant. Due to the incorporation of at least one additional heat sink, heat can be withdrawn from the coolant used as a heat source, for example, water, water-glycol mixture, (ambient) air. In this way, the temperature and the pressure of the refrigerant are increased in the refrigeration system, so that the heating power enabled by the refrigeration system, together with the compressor drive power, increases. Furthermore, the reheating mode or reheat mode is achieved by such a method by a compact interconnection of the refrigeration system using few active components.

In the reheating method, the ambient temperature can be detected and the method can be carried out when the ambient temperature is up to 15° C., in particular in a range from approximately 0° to 15°, i.e., up to a lower ambient temperature which still just permits a refrigeration system operation. In this way, it can be ensured that the described interconnection of the refrigeration system with additionally incorporated heat sink is performed when the operating and ambient conditions are favorable for such a reheating mode.

The incorporation of the at least one further heat sink can be carried out by opening an expansion valve connected upstream of the relevant heat sink. In particular, such an expansion valve can be opened step-by-step or incrementally.

The reheating method can comprise the following further steps:
setting the temperature flap in a target open position;

maintaining the target open position of the temperature flap;

step-by-step opening or step-by-step closing of the expansion valve as a function of the heating demand, which is ascertained on the basis of a refrigeration system parameter, until a predetermined pressure level results on the high-pressure side at the heating condenser and/or until the expansion valve has reached a maximum or minimum open position.

The reheating method reheat II (RH II) presented here can build directly on the functionality of the reheating method reheat I (RH I) contained in a parallel application. All functionalities of the reheating method reheat I (RH I) can be assumed and the heating power of the system can be increased by incorporating at least one further evaporator.

The reheating method can be carried out with temperature flaps kept essentially constant or open by direct influence on the pressure and temperature conditions in the refrigeration circuit. The reheating method described here can be ended upon reaching a corresponding position of the expansion valve or the operation can be switched over to another reheating method.

In the reheating method, multiple heat sinks can be incorporated in combination, wherein the respective expansion valves of the relevant heat sinks are opened or closed.

The target open position of the temperature flap can be set to a value between 60% and 90%, in particular to a value between 70% and 85%, in relation to a maximum open position of 100%.

In the reheating method, an expansion valve connected upstream of the evaporator can always be kept in an open position which, inter alia, is settable or is set as a function of the refrigeration power (dehumidifying demand) to be provided or requested. In other words, the evaporator always has refrigerant flowing through it in this reheating method, independently of which further heat sink(s) is/are incorporated. The air to be supplied to a vehicle interior is always dehumidified in this way.

After reaching a maximum open position of the expansion valve of the relevant (auxiliary) heat sink (evaporator), an electrical heating module can be switched in. A further increasing heating demand can be reacted to in this way. The maximum open position is to assume a reasonable and acceptable value here, which does not necessarily have to correspond to a 100% opening, but also can be less than 100%.

A refrigeration system for a motor vehicle is also proposed, having a refrigerant compressor, which is connectable or connected to a primary line and a secondary line;

an external heat exchanger, which is arranged in the primary line;

an evaporator, which is arranged in the primary line;

a heating register, which is arranged in the secondary line;

at least one movable temperature flap, which is arranged before or after the heating register with respect to a supply air flow direction;

at least one shutoff element, which is arranged downstream of the heating register in the secondary line;

wherein the refrigeration system is configured to be operated in an above-described reheating mode, and wherein in such a reheating mode, the refrigerant, starting from the refrigerant compressor, flows through the following components of the refrigeration system in succession: heating register in the secondary line, evaporator in the primary line, and a heat sink arranged fluidically in parallel or in series to the evaporator, in particular a chiller operating as a water heat pump evaporator and/or the external heat exchanger operating as an air heat pump evaporator.

The external heat exchanger can have bidirectional flow through it. In this way, an air heat pump mode can be enabled by means of the refrigeration system. Depending on the system design and line routing implemented, however, the external heat exchanger can also have monodirectional flow through it.

A shutoff valve can be arranged between the heating register and the evaporator and an expansion valve can be arranged between the heating register and the external heat exchanger. Both the shutoff valve and also the expansion valve represent a respective shutoff element, which is used for carrying out the reheating method. In such a configuration, the reheating method can be carried out with open shutoff valve and closed expansion valve, so that refrigerant can flow from the heating register directly to the evaporator.

Alternatively, a check valve can be arranged between the heating register and the evaporator. The check valve also represents a shutoff element, which is used for carrying out the reheating method. Such a check valve enables refrigerant to flow through from the heating register in the direction of the evaporator, wherein a through flow or also a backflow in the opposite direction is prevented. Furthermore, the external heat exchanger can have monodirectional flow through it. With such a configuration of the refrigeration system, an air heat pump mode is furthermore implementable, however, a reheating mode via a series circuit of heating register and the external heat exchanger is not possible, because a fluidic connection or line between the heating register and the external heat exchanger is dispensed with. Such a configuration thus represents a simplification of the refrigeration system, which can still be operated using the reheating method, however.

As stated above, the external heat exchanger can have monodirectional or bidirectional flow through it, depending on the embodiment of the refrigeration system. In a monodirectional variant, refrigerant always flows through the external heat exchanger in the same direction or in the same way in the refrigeration system mode and in the air heat pump mode. In a bidirectional variant, refrigerant flows through the external heat exchanger in the refrigeration system mode in another or different (opposite) direction than in the air heat pump mode. With respect to the external heat exchanger, it is also to be noted that it—similarly to the heating register—can emit heat to the (ambient) air or absorb heat therefrom both directly (as a gas condenser or gas cooler) and also indirectly (as a fluid heat exchanger).

An expansion valve can be arranged downstream of the evaporator, which is configured to set an intermediate pressure level at the evaporator. Icing of the evaporator can be counteracted in this way, because the pressure in the evaporator can be set so that icing due to water condensed out of the evaporator supply air flow can be precluded while further low-pressure side system sections can be operated at a lower pressure level.

A motor vehicle can be equipped with an above-described refrigeration system. The motor vehicle can in particular be an electric vehicle. In an electric vehicle, the efficient operation of the refrigeration system can result in power savings, so that in this way a greater range of the electric vehicle can be achieved.

BRIEF DESCRIPTION OF THE FIGURES

Further advantages and details of the invention result from the following description of embodiments with reference to the figures. In the figures.

DETAILED DESCRIPTION

Figure 1:
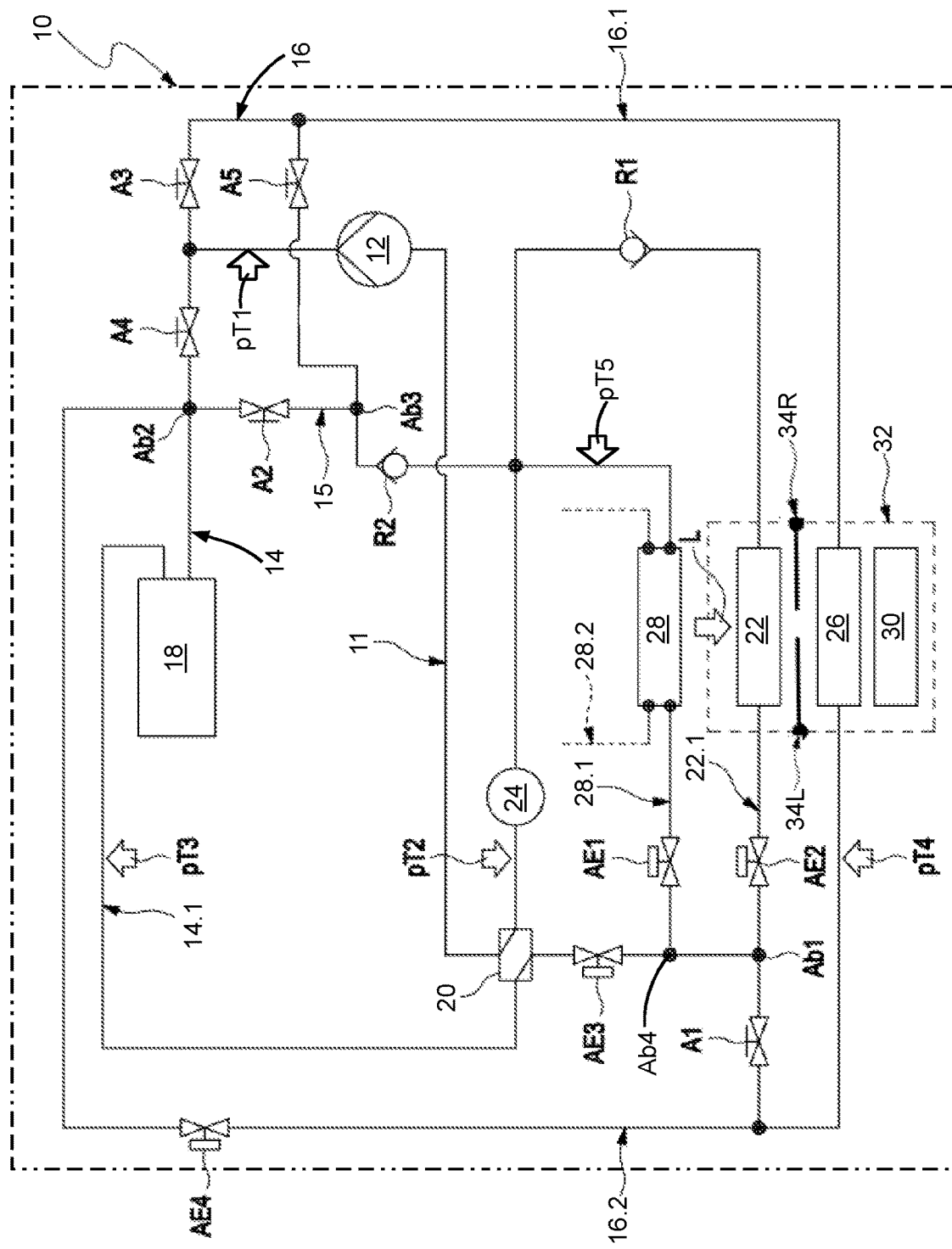
FIG. 1 shows a schematic and simplified circuit diagram of a refrigeration system for a motor vehicle.

FIG. 1 shows an embodiment of a refrigeration system 10 for a motor vehicle schematically and in simplified form. The refrigeration system 10 comprises a refrigerant circuit 11, which can be operated both in a refrigeration system mode (also referred to as AC mode in short) and also in a heat pump mode. In the embodiment shown, the refrigeration system 10 comprises a refrigerant compressor 12, an external heat exchanger 18, an internal heat exchanger 20, an evaporator 22, and an accumulator or refrigerant collector 24. The external heat exchanger 18 can be designed as a condenser or gas cooler. In particular, the external heat exchanger 18 can have bidirectional flow through it in the embodiment shown.

The evaporator 22 is shown here by way of example as a front evaporator for a vehicle. The evaporator 22 is also representative of further evaporators possible in a vehicle, for example, rear evaporators, which can be arranged fluidically in parallel to one another. In other words, the refrigeration system 10 thus comprises at least one evaporator 22.

A shutoff valve A4 is arranged downstream of the compressor 12. An expansion valve AE2 is provided upstream of the evaporator 22.

In the context of this description, in the entire refrigerant circuit 11 of the refrigeration system 10, the section from the compressor 12 to the outer heat exchanger 18, to the inner heat exchanger 20, and to the evaporator 22 is referred to as the primary line 14.

The refrigeration system 10 furthermore comprises a heating register 26 (also referred to as a heating condenser or heating gas cooler). A shutoff valve A3 is arranged upstream of the heating register 26. A shutoff valve A1 is arranged downstream of the heating register 26. Furthermore, an expansion valve AE4 is arranged downstream of the heating condenser 26.

In the context of this description, in the entire refrigerant circuit of the refrigeration system 10, the section from the compressor 12 to the heating register 26, to the expansion valve AE4, and to a branch Ab2 is referred to as the secondary line 16. The secondary line 16 comprises a heating branch 16.1, which extends from the shutoff valve A3 via the heating register 26 to the shutoff valve A1. Furthermore, the secondary line 16 comprises a reheating branch or reheat branch 16.2, which is fluidically connectable upstream to the heating register 26 and downstream to the external heat exchanger 18. The secondary line 16 or the reheat branch 16.2 opens at a branching point Ab2 into the primary line 14.

The refrigeration system 10 comprises a further evaporator or chiller 28. The chiller 28 is fluidically provided in parallel to the evaporator 22. The chiller 28 can be used, for example, for cooling an electrical component of the vehicle, but also for implementing a water heat pump function utilizing the waste heat of at least one electrical component. An expansion valve AE1 is connected upstream before the chiller 28.

The refrigeration system 10 can also have an electrical heating element 30, which is embodied, for example, as a high-voltage PTC heating element. The electrical heating element 30 is used as an auxiliary heater for a supply air flow L guided into the vehicle interior. The electrical heating element can be housed together with the heating register 26 and the evaporator 22 in an air conditioner 32. The electrical heating element 30 can be arranged connected downstream of the heating register 26.

Furthermore, check valves R1 and R2 are also visible in FIG. 1. Furthermore, several sensors pT1 to pT5 for detecting pressure and/or temperature of the refrigerant are also shown. It is to be noted that the number of the sensors and their arrangement are only shown by way of example here. A refrigeration system 10 can also have fewer or more sensors. In the example shown, combined pressure/temperature sensors pT1 to pT5 are shown as sensors. However, it is also conceivable that sensors separate from one another are used for measuring pressure or temperature and are possibly also arranged spatially separated from one another along the refrigerant lines.

The refrigeration system 10 can be operated in different modes, which are briefly described hereinafter.

In the AC mode of the refrigerant circuit 11, the refrigerant compressed to high pressure flows starting from the refrigerant compressor 12 with open shutoff valve A4 into the external heat exchanger 18. It flows from there to the high-pressure section of the internal heat exchanger 20 and the completely open expansion valve AE3. Via a branching point Ab1, the refrigerant can flow to the expansion valve AE2 and into the interior evaporator 22 (evaporator section 22.1). In parallel or alternatively, the refrigerant can flow via a branching point Ab4 and the expansion valve AE1 into the chiller 28 (chiller section 28.1). From the evaporator 22 and/or the chiller 28, the refrigerant flows on the low-pressure side into the collector 24 and through the low-pressure section of the interior heat exchanger 20 back to the compressor 12.

In the AC mode, the heating branch 16.1 or the secondary line 16 is shut off by means of the shutoff valve A3, so that hot refrigerant cannot flow through the heating register 26. To retrieve refrigerant from the inactive heating branch 16.1, the shutoff element A5 designed as a shutoff valve can be opened, so that the refrigerant can flow via the shutoff element A5 and the check valve R2, with shutoff element A2 closed at the same time, in the direction of the collector 24.

In the heating mode of the refrigerant circuit 11, the shutoff valve A4 is closed and the shutoff valve A3 is open, so that hot refrigerant can flow in the heating branch 16.1.

To carry out the heating function by means of the chiller 28 to implement a water heat pump mode, the refrigerant compressed by means of the refrigerant compressor 12 flows via the open shutoff valve A3 into the heating register 26. At the heating register 26, heat is emitted to a supply air flow L guided into the vehicle interior. The refrigerant subsequently flows via the open shutoff valve A1 and the branching point Ab1. It is expanded by means of the expansion valve AE1 in the chiller 28 to absorb waste heat of the electrical and/or electronic components arranged in a refrigerant circuit 28.2. In this heating function, the expansion valves AE3 and AE4 are closed, the shutoff valve A5 is closed, and the shutoff valve A2 is open. Refrigerant displaced in the water heat pump mode can be suctioned via the shutoff valve A2 from a bidirectional branch 14.1 or the primary line 14 and supplied via the check valve R2 to the collector 24.

To carry out the heating function by means of the external heat exchanger 18 as a heat pump evaporator, the refrigerant compressed by means of the refrigerant compressor 12 flows via the open shutoff valve A3 to emit heat to a supply air flow L into the heating register 26. Subsequently, it is expanded via the open shutoff valve A1 by means of the expansion valve AE3 in the external heat exchanger 18 to absorb heat from the ambient air. The refrigerant then flows via a heat pump recirculation branch 15 to the collector 24 and back to the refrigerant compressor 12. The expansion valves AE1, AE2, and AE4 remain closed in this case, as does the shutoff valve A5.

An indirect triangle circuit can be implemented in that with open shutoff valve A1, the refrigerant compressed by the refrigerant compressor 12 is expanded by means of the expansion valve AE1 in the chiller 28, wherein at the same time no mass flow is generated on the coolant side, thus in the refrigerant circuit 28.2, thus, for example, the fluid used as the refrigerant, such as water or water-glycol mixture, remains standing on the coolant side of the chiller 28 or coolant does not actively flow through the chiller 28. The expansion valves AE2, AE3, and AE4 remained closed in this switching variant.

In a reheating or reheat mode, the supply air flow L supplied into the vehicle interior is first cooled and thus dehumidified by means of the evaporator 22. Using the heat transferred to the refrigerant by evaporation and dehumidification and the heat supplied to the refrigerant via the compressor 12, the supply air flow L can be completely or at least partially heated again by means of the heating register 26.

For this purpose, the refrigeration system 10, in particular the air conditioner 32, has temperature flaps 34 which are settable, in particular controllable and pivotable, between the evaporator 22 and the heating register 26. In the illustrated example, a left and a right temperature flap 34L and 34R (schematically shown in FIG. 1) are arranged. The temperature flaps 34L, 34R can be set or pivoted between an open position, which is referred to as the 100% position, and a closed position, which is referred to as the 0% position. Alternatively, it is also possible to connect the temperature flaps 34R, 34L downstream from the heating register 26.

In the 100% position, the entire supply air flow L flowing through the evaporator 22 is guided via the heating register 26 and heated before it can flow into the passenger compartment of the vehicle. In the 0% position, the entire supply air flow L flowing through the evaporator 22 flows in the bypass around the heating register 26 without heating and thus without absorbing heat into the passenger compartment.

In an x position of the temperature flaps 34L and 34R at 0%<x<100%, these temperature flaps are only partially open, so that in each case only a partial air flow of the supply air flow L flowing through the evaporator 22 is guided via the heating register 26. This heated partial air flow can subsequently be admixed to the remaining cooled and dehumidified partial air flow. The supply air flow L heated in this way is supplied to the passenger compartment of the vehicle. For example, a 50% position indicates that the temperature flaps 34R and 34L are only open halfway, thus 50%.

A reheating or reheat mode of the refrigerant circuit 11 or the refrigeration system 10 is carried out in different ways as a function of the heat balance.

A possible operating method 500 for the reheating or reheat mode is explained by way of example hereinafter on the basis of the flow chart of FIG. 2 and with reference to the refrigeration system and its components shown in FIG. 1. Such an operating method is typically implemented as a control program in a control unit for the refrigeration system or for the climate control in a vehicle.

A reheating mode is considered in which the refrigerant flows starting from the compressor 12 via the open shutoff valve A3 to the heating register 26 (heating condenser or heating gas cooler). The expansion valve AE4 is closed and the shutoff valve A1 is open, so that the refrigerant can flow via the expansion valve AE2 into the evaporator 22. The chiller 28 is fluidically incorporated as a further heat sink. Accordingly, the expansion valve AE1 is also in an open position. For the further consideration, it is presumed that the expansion valve AE3 is closed. The reheating mode is thus achieved using an interconnection of the refrigeration system 10 having the fewest possible active components.

The incorporation of the chiller 28 can take place via a system-side forced request due to the existing demand for cooling of at least one high-voltage component or as a heating demand request for generating additional heating power at the heating register 26, which is to be functionally equated to a "voluntary" high-voltage component cooling.

Figure 2:
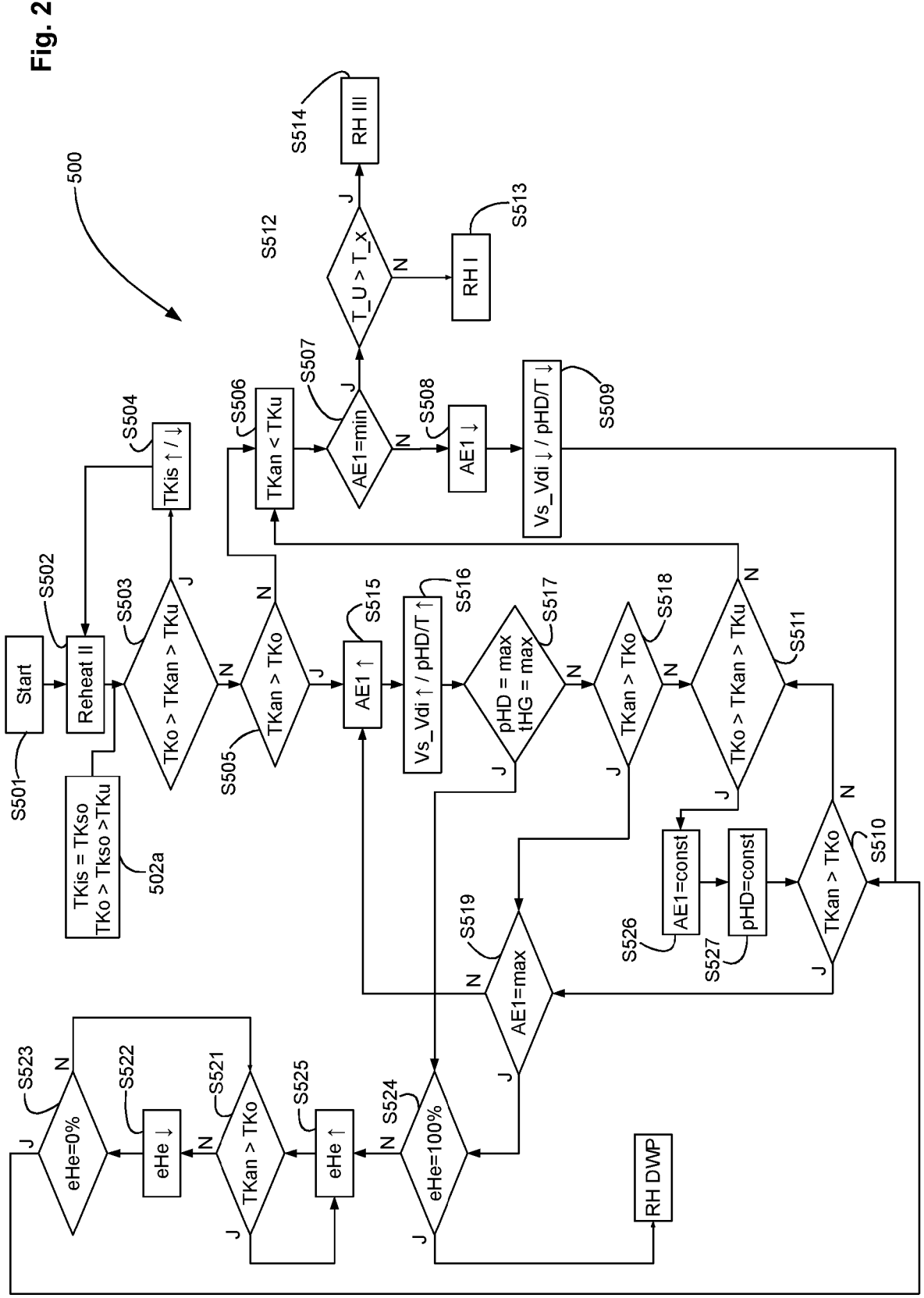
FIG. 2 shows a flow chart of an exemplary implementation of the reheating method, in particular by means of the refrigeration system described in FIG. 1.

According to the reheating method 500 shown in FIG. 2, in operation after the start (S501) of the refrigeration system 10 to a point in time not designated in greater detail here, a transition takes place into a reheating mode, which is indicated here with reheat II (S502). A possible condition which has to be met to start the reheating mode (S502) can be, for example, the measured ambient temperature. The reheating method can be activated in particular if the ambient temperature is up to 15° C., in particular is approximately 0° C. to 15° C.

In the reheating method 500, in this application, the two temperature flaps 34L, 34R are set into a target open position TKso. TKso can be a specific opening value or can, as shown in FIG. 2 at 502a, be arranged from an upper opening limiting value TKo to a lower opening limiting value TKu. During the operation of the refrigeration system 10, it is determined via at least one refrigeration system parameter whether the heating demand is steady, increasing, or decreasing. A variable or refrigeration system parameter used here by way of example is the temperature flap opening TKan requested on the part of a control unit. If a greater temperature flap opening TKan is requested, the heating demand is increasing. If a lesser temperature flap opening TKan is requested, the heating demand is decreasing. For the following description, it is to be noted that a temperature flap opening TKan requested on the system side does not necessarily result in the reheating method considered here in a corresponding adjustment of the real open position or actual open position TKis of the temperature flaps 34L, 34R.

As already mentioned, it is presumed that the temperature flaps are in an actual open position TKis, which is in the range from TKo to TKu. According to step S503, it is checked whether a requested temperature flap opening TKan is less than the upper opening limiting value TKo and greater than the lower opening limiting value TKu. If this is the case, according to step S504, the temperature flaps 34L, 34R can be adjusted in their actual open position TKis, which is indicated by the two arrows in step S504. The refrigeration circuit and/or the periphery influencing the change of the climatic conditions remain unchanged. If the condition of step S503 is not met, it is checked in S505 whether the requested temperature flap opening is greater than the upper opening limiting value TKo. Outside these limits, a change and thus a reaction to the changed requirements and boundary conditions takes place on the part of the refrigeration circuit and/or the periphery influencing the change of the climatic conditions.

If this is not the case, the requested open position TKan is less than the lower opening limiting value TKu (S506). This means that the heating demand is decreasing and that the temperature flaps 34L, 34R actually have to be closed further. According to the reheating method 500 described here, however, no further closing of the temperature flaps takes place. Rather, it is checked in step S507 whether the expansion valve AE1 connected upstream from the chiller 28 is already set to a minimum value, in particular is closed. If this is the case, it can be checked in S512 whether the ambient temperature T_U is higher than a predetermined comparison temperature value T_x. Depending on the result of the check in S512, a different reheating mode is selected or the refrigeration system is switched to a different reheating mode, which are identified here by RH I or RH III, respectively (S513, S514).

If the expansion valve AE1 is not set to its minimum value according to S507, it is closed further according to S507. In this way, the volume flow Vs_Vdi to be provided by the compressor is reduced. Pressure and temperature of the refrigerant also decrease accordingly (S509).

If the minimum settable position of the expansion valve is not yet reached, and the heating demand is decreasing further, which is established by checking the conditions in S510 and S511, further closing of the expansion valve takes place according to S508. As long as the heating demand is decreasing, steps S506, S507, S508, S509, S510, S511 are run through multiple times in succession.

In S510, a check takes place as to whether the requested temperature flap opening TKan is greater than the upper opening limiting value TKo. If this is not the case, it is checked in S511 whether the requested temperature flap opening is in the target range, thus between TKo and TKu. If this is the case, it is presumed that the set position of the expansion valve AE1 is matching and can essentially be maintained (S526). In this way, according to S527, the pressure pHD and also the hot gas temperature tHG are kept essentially constant.

In the case of an increasing heating demand, the method is carried out as follows starting from above-mentioned steps S503 and S505. If it is established in S505 that the requested temperature flap opening TKan is greater than the upper opening limiting value TKo, this means that the heating demand is increasing and that the temperature flaps 34L, 34R actually have to be opened further. According to the method described here, however, further opening of the temperature flaps does not (yet) take place. Rather, in step S515, the expansion valve AE1 is opened. Due to the opening of the expansion valve AE1, the heat supply from the chiller 28 into the refrigeration circuit is enabled or increased. In this way, according to step S516, the volume flow Vs_Vdi to be provided by the compressor 12 increases. Pressure and temperature of the refrigerant also increase accordingly.

In S517, it is checked whether the high pressure pHD applied in the refrigeration circuit 10 and/or the hot gas temperature tHG has reached a maximum value. If this is not the case, the check takes place in S518 as to whether the requested temperature flap opening TKan is greater than the upper opening limiting value TKo. If this is the case, it is checked in S519 whether the expansion valve AE1 is already set to a maximum possible opening value. If the maximum settable open position of the expansion valve AE1 is not yet reached, the sequence branches again to S515 and the expansion valve AE1 is opened further (step-by-step or incrementally).

As long as the heating demand is increasing, steps S515, S516, S517, S518, S519 are run through multiple times in succession.

If it is established in S517 that a maximum pressure pHD and/or a maximum hot gas temperature tHG is reached and thus a further performance increase via the refrigeration circuit is excluded, the sequence branches to S524. In S524, it is checked whether the electrical heating element 30 is already in operation at full power. If this is not the case, in S525, switching on of the electrical heating element or an increase of its power or heat emission to the cabin supply air flow takes place. If, according to S521, the requested temperature flap opening TKan is still above the upper opening limiting value TKo, the heating power or heat emission of the electrical heating element 30 is increased further (S525). If the condition should no longer be met in S521 due to decreasing heating demand, the heating power or heat emission of the electrical heating element 30 is reduced further according to S522. If the electrical heating element 30 is no longer active, which is checked in S523, the sequence branches to steps S510 and S511, so that with decreasing or decreased heating demand, an adaptation of the pressure can be achieved again by setting, in particular closing the open position of the expansion valve AE1 (S508). If the condition is met in S524, a switch is made to a different operating mode or reheating mode of the refrigeration system 10, which is identified here solely by way of example with DWP-RH (S528). However, it can be presumed that with maximum set waste heat via the refrigeration circuit and with maximum heating power, set via an electrical auxiliary heater, the system can have reached its heating power limits and is thus operated at its limit.

In addition to the above-described measures for carrying out the reheating method, the methods from the reheating method reheat I (RH I) contained in a parallel application can be used for power variation on the evaporator. In particular, the amount of supply air L supplied to the evaporator 22 can be set in order to influence the heating power. Fresh air or circulated air or a mixture of fresh air and circulated air can be used as the supplied supply air. Alternatively, the target temperature of the air after the evaporator can be changed in the permissible limits defined by the control unit. This change is oriented in particular to the dehumidification demand.

The reheating method shown in FIG. 2 was described on the basis of the example of the additionally incorporated chiller with its expansion valve AE1 connected upstream. It is to be noted that the method can also be carried out by means of the external heat exchanger 18 and with open or settable expansion valve AE3. In this case, the external heat exchanger 18 is fluidically provided in parallel to the evaporator 22 and operates as an air heat pump evaporator. Accordingly, AE3 can also stand at all points in FIG. 2 at which AE1 is mentioned. It is also conceivable that both the chiller 28 and also the external heat exchanger 18 are incorporated jointly as heat sinks. Accordingly, according to the method shown in FIG. 2, the open positions of AE1 and AE3 would then be checked or set.

Figure 3:
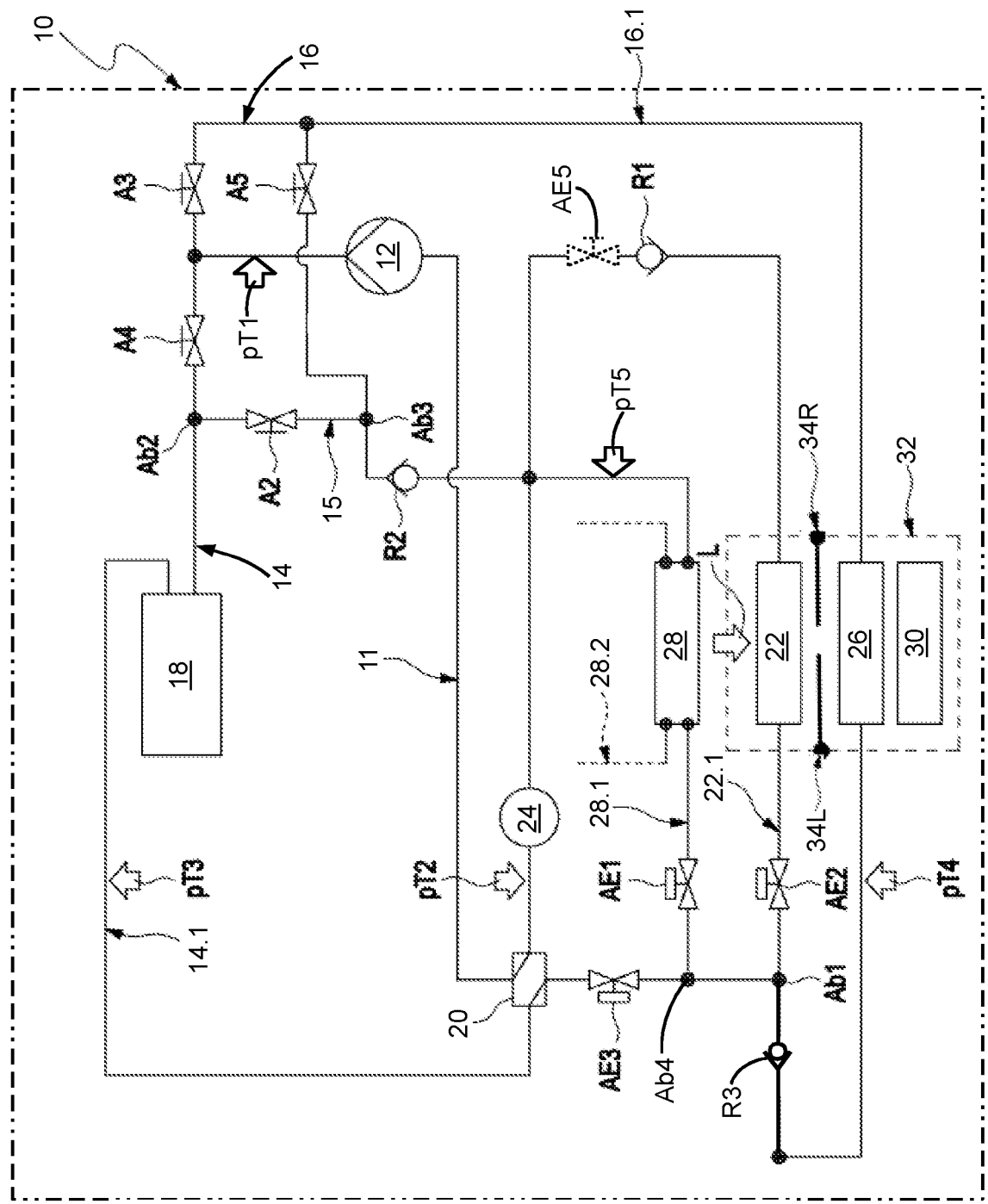
FIG. 3 shows a schematic and simplified circuit diagram of an embodiment of a refrigeration system for a motor vehicle for carrying out the reheating method.

FIG. 3 shows an embodiment of a refrigeration system 110, using which the reheating method reheat II described above with reference to FIG. 2 can also be carried out. The refrigeration system 110 according to this embodiment is structurally simplified in comparison to the refrigeration system shown in FIG. 1. As is apparent from FIG. 3, only a connection from the evaporator 22 or the chiller 28 is still provided downstream of the heating register 26. The refrigeration system 110 no longer has a reheating branch or reheat branch 16.2 (FIG. 1). Accordingly, the external heat exchanger 18 also can no longer be connected in series to the heating register 26.

To also be able to carry out the above-described reheating method using the simplified refrigeration system 110, a check valve R3 is arranged between the heating register 26 and the expansion valve AE2 or the expansion valve AE1. The check valve R3 enables refrigerant to flow through from the heating register 26 to the evaporator 22 according to the above-described reheating method, but prevents a refrigerant flow in the reverse direction, thus when the refrigeration system operates in the AC mode.

In FIG. 3, an expansion valve AE5 is furthermore shown by dashed lines downstream of the evaporator 22. Such an expansion valve AE5 can be arranged in all embodiments shown here of the refrigeration system 10, 110 (FIGS. 1, 3, 4) instead of the check valve R1 shown. Due to the arrangement of the expansion valve AE5 downstream of the evaporator 22, an intermediate pressure level can be achieved at the evaporator 22 which is above the icing limit. Each further heat sink which is incorporated can be operated at low low-pressure level.

Figure 4:
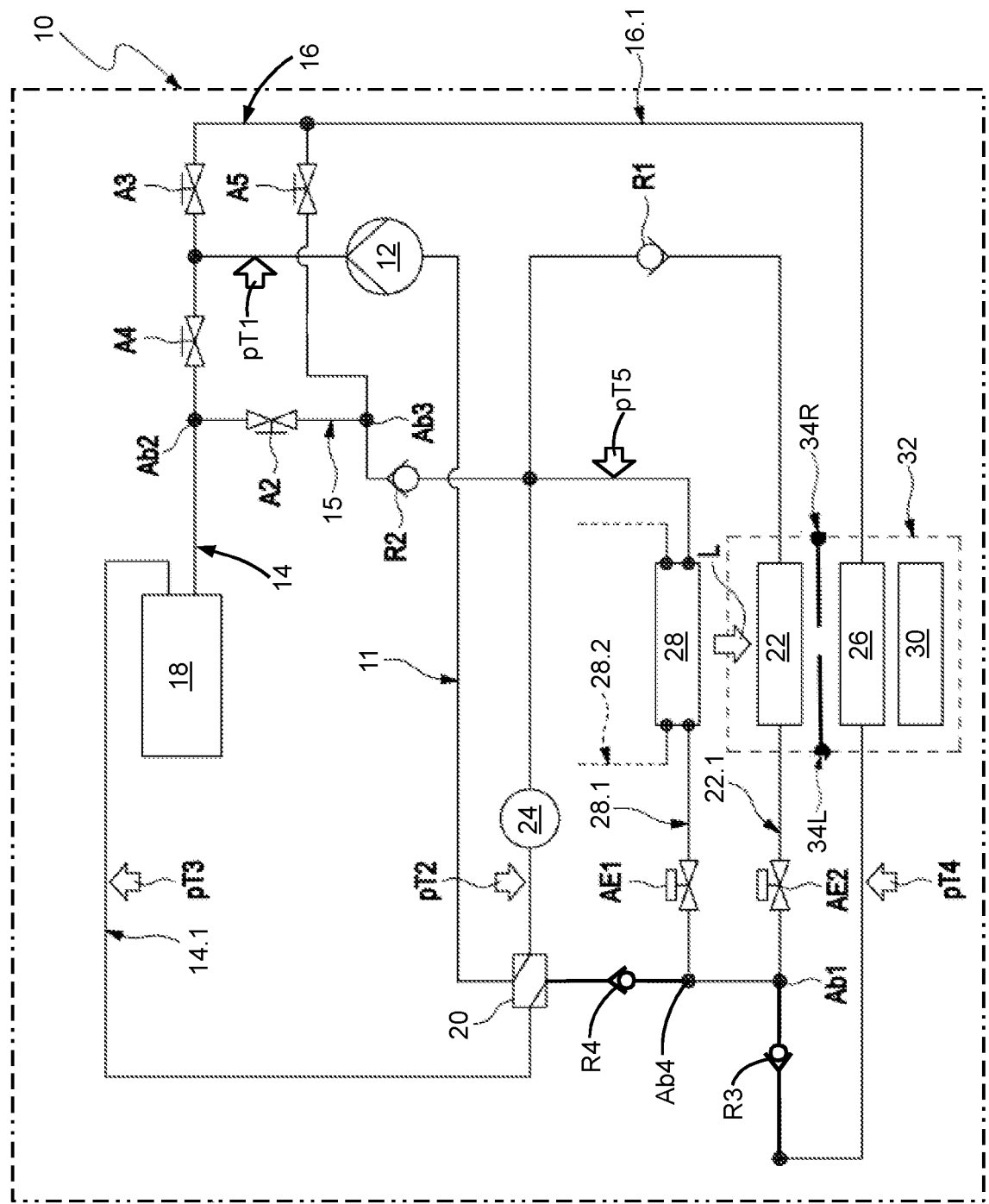
FIG. 4 shows a schematic and simplified circuit diagram of an embodiment of a refrigeration system for a motor vehicle for carrying out the reheating method.

FIG. 4 shows the simplified refrigeration system having a further possible adaptation. Instead of the expansion valve AE3 still provided in FIG. 3, a check valve R4 can be provided, which is arranged between the internal heat exchanger 20 and the evaporator 22 or chiller 28. Refrigerant flows through the check valve R4 in the AC mode of the refrigeration system 110. In a heating mode, the check valve R4 prevents a refrigerant flow from the heating register 26 to the high-pressure side of the internal heat exchanger 20. The above-described reheating method (FIG. 2) can also be carried out using this further simplified configuration of the refrigeration system 110.

It is also to be noted with respect to the adapted structure of the refrigeration system 110 according to FIGS. 3 and 4 that using such a configuration, switching over to a different reheating method RH III, which is illustrated in steps S513 and S525, is not possible, but rather system-side adjustments SYS have to be performed.

The reheating method described above with reference to FIG. 2 can be carried out, for example, using the following values. TKso can be set from 60% to 90%, in particular to a value between 70% and 85%, with respect to the maximum open position of 100%. For example, TKu can be 78% and TKo can be 82%, so that TKso covers a range from 78% to 82%. The selection of matching opening limiting values TKu and TKo can be selected in particular as a function of properties of the refrigeration system used, wherein the range from TKu to TKo is to be selected rather narrowly, in particular so that the quotient TKu/TKo is greater than or equal to 0.8. For the above example with TKu=78% and TKo=82%, the quotient is calculated as 0.95.

The reheating method described in the scope of this application can be achieved by incorporating further heat sinks, for example, the chiller 28 and/or external heat exchanger 18. The possibility of a simplified structure of the refrigeration system 110 can also be taken into consideration.

In summary, the reheating method reheat II (RH II) presented here is a reheating method which builds on a reheating method reheat I (RH I) contained in a parallel application, wherein a further evaporator and thus an additional heat sink (a chiller here, for example) is incorporated.

However, if a "forced incorporation" of the chiller should occur to cover the heating demand instead of the "voluntary" incorporation of the chiller, i.e., active battery cooling is required on the part of the thermal management, the described sequence for the stepped tripping of the chiller can no longer be followed. A heating demand access can then be compensated for by a change to a reheating method reheat III (RH III) contained in a parallel application.

The invention claimed is:

1. A refrigeration system for a motor vehicle, comprising:
a refrigerant compressor, which is selectively connectable to or fixedly connected to a primary line and a secondary line;
an external heat exchanger, which is arranged in the primary line;
an evaporator, which is arranged in the primary line;
a heating register, which is arranged in the secondary line;
at least one movable temperature flap, which is arranged before or after the heating register with respect to a supply air flow direction;
at least one shutoff element, which is arranged downstream of the heating register in the secondary line;
wherein the refrigeration system is configured to be operated in a reheating mode whereby the at least one shutoff element is set in a position in which the refrigerant flows into the evaporator downstream of the heating register while bypassing the external heat exchanger, and
wherein, in such a reheating mode, the refrigerant flows through the following components of the refrigeration system in succession, starting from the refrigerant compressor: the heating register in the secondary line, the evaporator in the primary line, and a heat sink arranged fluidically in parallel or in series to the evaporator and configured to extract heat from the refrigeration system.

2. The refrigeration system of claim 1, wherein the flow through the external heat exchanger is bidirectional.

3. The refrigeration system of claim 1, wherein a shutoff valve is arranged between the heating register and the evaporator and wherein an expansion valve is arranged between the heating register and the external heat exchanger.

4. A motor vehicle having a refrigeration system of claim 1.

5. The refrigeration system of claim 1, wherein a check valve is arranged between the heating register and the evaporator.

6. The refrigeration system of claim 5, wherein the flow through the external heat exchanger is unidirectional and the external heat exchanger is separate from the heating register.

7. A reheating method for operating a refrigeration system for a motor vehicle, wherein the refrigeration system comprises:
a refrigerant compressor, which is selectively connectable to or fixedly connected to a primary line and a secondary line;
an external heat exchanger, which is arranged in the primary line;
an evaporator, which is arranged in the primary line;
a heating register, which is arranged in the secondary line;
at least one movable temperature flap, which is arranged before or after the heating register with respect to a supply air flow direction;
at least one shutoff element, which is arranged downstream of the heating register in the secondary line;
wherein the reheating method comprises the following steps:

setting the at least one shutoff element in a position in which the refrigerant flows into the evaporator downstream of the heating register while bypassing the external heat exchanger, and incorporating at least one further heat sink configured to extract heat from the refrigeration system, which is fluidically arranged in parallel or in series to the evaporator.

8. The reheating method of claim 7, wherein an expansion valve connected upstream of the evaporator is always kept in an open position, which is settable in dependence on a prevailing pressure level.

9. The reheating method of claim 7, wherein the ambient temperature is detected and the method is carried out when the ambient temperature is up to 15° C.

10. The reheating method of claim 9, wherein the incorporation of the at least one further heat sink is carried out by opening an expansion valve connected upstream of the relevant heat sink.

11. The reheating method of claim 9, wherein an expansion valve connected upstream of the evaporator is always kept in an open position, which is settable in dependence on a prevailing pressure level.

12. The reheating method of claim 7, wherein the incorporation of the at least one further heat sink is carried out by opening an expansion valve connected upstream of the relevant heat sink.

13. The reheating method of claim 12, wherein after reaching a maximum open position of the expansion valve of the relevant heat sink, an electrical heating module is switched on.

14. The reheating method of claim 12, wherein an expansion valve connected upstream of the evaporator is always kept in an open position, which is settable in dependence on a prevailing pressure level.

15. The reheating method of claim 12, wherein multiple heat sinks are incorporated in combination, wherein the respective expansion valves of the relevant heat sinks are opened or closed.

16. The reheating method of claim 15, wherein the target open position of the temperature flap is set to a value between 60% and 90%, in relation to a maximum open position of 100%.

17. The reheating method of claim 12, furthermore comprising the following steps:
setting the temperature flap in a target open position;
maintaining the target open position of the temperature flap;
gradually opening or gradually closing of the expansion valve as a function of heating demand, which is ascertained on the basis of a refrigeration system parameter, until a predetermined pressure level results on a high-pressure side at the heating register and/or until the expansion valve has reached a maximum or minimum open position.

18. The reheating method of claim 17, wherein multiple heat sinks are incorporated in combination, wherein the respective expansion valves of the relevant heat sinks are opened or closed.

19. The reheating method of claim 17, wherein the target open position of the temperature flap is set to a value between 60% and 90%, in relation to a maximum open position of 100%.

20. The refrigeration system of claim 19, wherein an expansion valve is arranged downstream of the evaporator, which is configured to set an intermediate pressure level at the evaporator.

* * * * *